United States Patent
Urabe

(10) Patent No.: US 6,924,592 B2
(45) Date of Patent: Aug. 2, 2005

(54) EL PHOSPHOR POWDER AND EL DEVICE

(75) Inventor: Shigeharu Urabe, Minami-ashigara (JP)

(73) Assignee: Fuji Photo Film Co., Ltd, Kanagawa (JP)

( * ) Notice: Subject to any disclaimer, the term of this patent is extended or adjusted under 35 U.S.C. 154(b) by 43 days.

(21) Appl. No.: 10/682,532

(22) Filed: Oct. 10, 2003

(65) Prior Publication Data

US 2004/0145302 A1 Jul. 29, 2004

(30) Foreign Application Priority Data

Oct. 10, 2002 (JP) .................................... 2002-297228

(51) Int. Cl.$^7$ ........................... H05B 33/14; C01G 9/08
(52) U.S. Cl. ................. 313/503; 313/502; 252/301.6 S
(58) Field of Search ................................ 313/503, 502; 252/301.6 S

(56) References Cited

U.S. PATENT DOCUMENTS 5,644,193 A * 7/1997 Matsuda et al. ............ 313/486

FOREIGN PATENT DOCUMENTS

| JP | 8-183954 A | 7/1996 |
| JP | 11-193378 A | 7/1999 |

* cited by examiner

Primary Examiner—Nimeshkumar D. Patel
Assistant Examiner—Sharlene Leurig
(74) Attorney, Agent, or Firm—Sughrue Mion, PLLC

(57) ABSTRACT

Disclosed is EL phosphor powder which contains phosphor particles that comprise zinc sulfide as the matrix thereof and contain an activator and a co-activator, wherein at least 30% of the number of the phosphor particles contained in the EL phosphor powder are those having an aspect ratio (length of major axis/length of minor axis) of at least 3. EL devices comprising the EL phosphor powder enable bright light emission.

16 Claims, No Drawings

EL PHOSPHOR POWDER AND EL DEVICE

BACKGROUND OF THE INVENTION

1. Technical Field

The present invention relates to electroluminescent (this is herein abbreviated to "EL") phosphor powder that comprises zinc sulfide as the matrix thereof and contains both an activator and a co-activator to be the radiative recombination center thereof, and to a bright and long-life EL device that comprises the powder.

2. Background Art

An EL device emits light when excited by electric power, for which known are a dispersion-type EL element where phosphor powder is sandwiched between electrodes, and a thin film-type EL element. Generally, a dispersion-type EL device is so designed that a dispersion of phosphor powder in a binder having a high dielectric constant is sandwiched between two electrode sheets at least one of which is transparent, and this emits light when an alternating current is applied between the two electrodes. The EL device that comprises such EL phosphor powder has many advantages in that it may be thinned to have a thickness of a few mm or less and, since it is a surface-emitting device, it does not generate heat and its light emission efficiency is high. Therefore, EL devices are expected to have many applications for traffic sings, lighting equipment for various interiors and exteriors, light sources for flat panel displays such as liquid-crystalline displays, lighting equipment for large-area advertising pillars, etc.

EL phosphor powder well known in the art comprises zinc sulfide as the matrix thereof, along with an activator such as copper (metal ion serving as a radiative combination center) and a co-activator such as chlorine added thereto. However, the light-emitting device that comprises the phosphor powder has some drawbacks in that its brightness is low and its light emission life is short, as compared with those of light-emitting devices based on any other principle, and therefore, various improvements have heretofore been made on the phosphor powder.

Regarding the structure of phosphor particles that enable light emission of high brightness, JP-A 8-183954 (pp. 3–4, FIG. 1) discloses zinc sulfide phosphor particles that are characterized in that they have a real stacking defects of high density uniformly and everywhere in each particle and the mean spacing of the stacking defects is from 0.2 to 10 nm. This says as follows: In the particles, copper ions serving as an activator are localized in the stacking defects of the matrix crystal of zinc sulfide, and they form conductive layers. Accordingly, when a voltage is applied thereto, the particles may release electrons and holes at high efficiency, and therefore enable light emission of high brightness.

On the other hand, using a single crystal of zinc sulfide, the relationship between the light-emitting mechanism and the structure of the crystal particles has been studied in detail. In particular, an important conclusion has been obtained for the relationship between the direction of the electric field applied to them and the orientation of the phosphor particles (*Physical Review* 149–158, Vol. 125, No.1 (1962), page 150, FIG. 1). Specifically, when the direction of the electric field applied to them and the (111) face of the zinc sulfide phosphor particle are parallel to each other, then the brightness of light from the particles is the maximum.

When single-crystal zinc sulfide is used, the direction of the electric filed to be applied to it and the crystal orientation may be controlled. However, in a dispersion of fine particles, the individual phosphor particles are randomly dispersed, and the dispersion will be applied to a substrate by printing (or coating) thereon. In this case, therefore, when an electric field is applied to them, the individual phosphor particles are randomly oriented relative to the electric field, and, as a result, only a part of the particles could emit light at high efficiency.

Taking the prior art problems into consideration, the present invention is to provide an EL device of high brightness sufficient for light emission and to provide an EL phosphor powder for it.

SUMMARY OF THE INVENTION

For increasing the brightness of an EL device that comprises a zinc sulfide phosphor dispersed between electrodes, it is important that the individual phosphor particles may uniformly emit bright light. In order to make the individual phosphor particles uniformly emit bright light, it is necessary that, when a certain electric field is applied to the EL device, the individual phosphor particles are so oriented that they may emit bright light. However, conventional phosphor particles could not be oriented in a predetermined direction. Given that situation, we, the present inventors have assiduously studied so as to make phosphor particles oriented in a predetermined direction, and, as a result, have found that, when EL phosphor powder that contains at least a predetermined amount of phosphor particles having an aspect ratio (length of major axis/length of minor axis) of at least 3 is used, then the phosphor particles may be oriented in a desired direction. Specifically, we have found that, when a dispersion of the EL phosphor powder of the invention is applied onto a support to be an electrode and dried thereon, then the major axis of each phosphor particle can be oriented in the direction parallel to the support. The phosphor particles have a real defects (dislocations existing in and on twin planes) vertically to the major axis, and therefore, when an electric field is applied to them vertically to the surface of the support coated with the phosphor powder dispersion, then the a real defects are oriented to be parallel to the electric field and the phosphor powder may therefore emit bright light.

Having the constitution mentioned below, the present invention has been provided on the basis of these findings.

(1) EL phosphor powder which contains phosphor particles that comprise zinc sulfide as a matrix thereof and contain an activator and a co-activator, wherein the phosphor particles are so designed that the number of those having an aspect ratio (length of major axis/length of minor axis) of at least 3 is at least 30% of all of them.

(2) The EL phosphor powder of (1), wherein the EL phosphor particles have a real stacking defects and the mean spacing of the stacking defects is from 0.5 to 20 nm.

(3) The EL phosphor powder of (1) or (2), wherein the activator is ions of at least one selected from copper, manganese, silver, gold and rare earth elements.

(4) The EL phosphor powder of any of (1) to (3), wherein the co-activator is ions of at least one selected from chlorine, bromine, iodine and aluminium.

(5) The EL phosphor powder of any of (1) to (4), wherein the activator is copper ions and the co-activator is chloride ions.

(6) The EL phosphor powder of any of (1) to (5), wherein the mean length of the major axis of the EL phosphor particles having an aspect ratio (length of major axis/length of minor axis) of at least 3 is at most 100 μm (its lowermost limit is preferably at least 2 μm).

(7) An EL device which has the EL phosphor powder of any of (1) to (6) between the electrodes therein, and in which at least 80% by number of the phosphor particles having an aspect ratio (length of major axis/length of minor axis) of at least 3 are so oriented that their major axes are at an angle of at most 30° to the faces of the electrodes.

BEST MODE FOR CARRYING OUT THE INVENTION

The EL phosphor powder and the EL device of the invention are described in detail hereinunder. In this description, the numerical range expressed by the wording "from a number to another number" means the range that falls between the former number indicating the lowermost limit of the range and the latter number indicating the uppermost limit thereof.

The EL phosphor powder of the invention contains phosphor particles that comprise zinc sulfide as the matrix thereof and contain both an activator (metal ion) and an co-activator to be the radiative recombination center thereof. Zinc sulfide includes two crystal morphologies. When grown at a high temperature (1024° C. or higher), it forms hexagonal crystals (wurtzite structure β-ZnS) ; but when grown at a temperature lower than it, the compound forms cubic crystals (zinc blend structure α-ZnS). For forming phosphor particles having an aspect ratio (length of major axis/length of minor axis) of at least 3, the crystal is preferably grown in the direction of the C axis of the hexagonal system thereof. For this, it is desirable that the starting fine particles of zinc sulfide (generally smaller than 3 μm) are fired at a high temperature of from 1020 to 1200° C. for 1 to 10 hours in the presence of a flux. In this step, smaller particles fuse while larger particles grow through Ostwald ripening, and, on the other hand, particles may aggregate together and adhere to each other and fuse together to grow. In the former case, the growth in the direction of the C axis of the hexagonal crystals may be promoted based on the crystal structure of the hexagonal system whereby particles having a large aspect ratio may be obtained. However, when the crystals grow according to the latter aggregation mechanism, then the aggregated crystals may be often amorphous even though they may have a wurtzite structure. To prevent the aggregation growth, a particle aggregation inhibitor is preferably added to the system being fired. The aggregation inhibitor for use in the invention is not specifically defined in point of its type, and it may be, for example, fine particles having a melting point higher than the firing temperature (1300° C.). Preferably, the particle size of the aggregation inhibitor is from 0.1 to 10 μm, more preferably from 0.5 to 5 μm. Preferred examples of the material of the aggregation inhibitor are metal oxides such as aluminium oxide, silicon oxide, zirconium oxide; nitrides such as silicon nitride, aluminium nitride; and carbides such as silicon carbide, tungsten carbide, tantalum carbide. For the details of this technique, for example, referred to are Table 1 and FIG. 2 in JP-A 11-193378 (pp. 4–5).

In this description, the major axis and the minor axis of the phosphor particles are defined as follows: When the phosphor particles are observed with a microscope (optical microscope or electronic microscope) in such a manner that they do not overlap with each other, the longest axis of the phosphor particle is referred to as a major axis thereof, and the axis that is perpendicular to it is referred to as a minor axis. The length of the minor axis of the phosphor particle is defined as the length of the shorter side of the rectangle the longer side of which corresponds to the major axis of the particle and the area is the same as the projected area of the particle. Of the phosphor particles that constitute the EL phosphor powder of the invention, at least 30% by number have an aspect ratio of at least 3. The proportion of the particles having an aspect ratio of at least 3 is preferably at least 40%, more preferably at least 50%. Also preferably, the upper most limit of the aspect ratio of the phosphor particles that constitute the EL phosphor powder of the invention is 50. Regarding their shape, the phosphor particles that constitute the EL phosphor powder of the invention may be columnar, oval or pillar-shaped. However, if tabular phosphor particles are applied to a support and dried to form a phosphor layer thereon, then their (111) faces are oriented in parallel to the support, and, if so, the (111) face defects of the layer are to be vertical to the electric field that is applied to the support vertically thereto and the light emission efficiency of the particles is thereby lowered. Accordingly, the invention is not directed to such tabular particles.

The activator to be the radiative recombination center for the phosphor particles may be any and every one that is generally used as an activator for phosphors. For example, preferred for it are various metal ions of copper, manganese, silver, gold, rare earth metals, etc. Concretely, it is desirable that these elements are in the form of acetates, sulfates, etc. One or more of these may be used herein either singly or as combined. The wavelength (color) of fluorescence emission depends on the type of the activator. For example, fluorescence includes bluish green (copper), orange (manganese) and blue (silver). The preferred range of the concentration of the activator depends on the type thereof. For example, for the copper activator, its concentration may be from 0.01 to 0.1 mol % in terms of the copper concentration relative to the matrix, zinc sulfide in the final product.

Preferably, a flux is added to the phosphor particles of the invention.

Examples of the flux are alkali or alkaline earth metal halides, and ammonia halides. Concretely, the flux includes $MgCl_2.6H_2O$, $BaCl_2.2H_2O$, and $NH_4Cl$. As combined, two or more of these may be added to the particles. The flux assists the crystal growth of the matrix, zinc sulfide, and serves as the source of the co-activator. It is desirable that the amount of the flux to be added is from 5 to 70 mol %, preferably from 5 to 40 mol %, more preferably from 5 to 25 mol % relative to the starting material, zinc sulfide. Preferably, a flux capable of providing ions of at least one selected from chlorine, bromine, iodine and aluminium for the co-activator is used herein. More preferably, a flux capable of providing a chloride ion for the co-activator is sued.

A preferred method for producing the EL phosphor powder of the invention is described concretely hereinunder.

Powder that contains the above-mentioned starting materials and an activator is well mixed and fired for primary firing at 1000 to 1300° C. for 3 to 10 hours. The intermediate phosphor powder thus obtained through the primary firing is in the form of lumps of brittlely bonded fired powder, and when it is put into water, then it is readily broken and the fired powder disperses in water. The fired powder is repeatedly washed with ion-exchanged water to thereby remove the alkali metal or alkaline earth metal and the excessive activator and co-activator.

Inside the intermediate phosphor powder thus obtained through the primary firing, there exist naturally-occurred stacking defects (twin crystal structure) though their density is low. However, these are still insufficient for high-efficiency light emission from the powder. Therefore, some impact force is applied to the powder so as to significantly increase the density of the stacking defects, not destroying the particles. For imparting the impact force thereto, for example, heretofore known is a method of contacting and mixing the intermediate phosphor particles together, or a method of mixing them along with beads of alumina or the like (ball milling), or a method of accelerating the particles to make them collide with each other (see JP-A 6-306355, pp. 3–4, Tables 1–3; JP-A 9-59616, pp. 4–5, FIGS. 1, 2).

Next, the thus-obtained intermediate phosphor powder is fired for secondary firing. In the secondary firing, the powder is annealed at a temperature lower than that in the primary firing, 500 to 800° C., for a shorter period of time, 30 minutes to 3 hours. Through the annealing, the hexagonal intermediate phosphor crystals are transferred into cubic crystals. The hexagonal crystals formed in the previous step have many defects (dislocations) owing to the impact force applied thereto in that step, and the crystal transfer occurs predominantly in the defects in the secondary firing. Accordingly, high-density interfaces are formed between the hexagonal crystals and the cubic crystals, and, as a result, high-density twin planes are introduced into the thus-annealed crystals. This may be confirmed through TEM observation of the cross section of the phosphor particle that shows a large number of parallel twin planes existing in each particle. It is believed that the activator such as copper ion that has been uniformly doped into the particles through the primary firing may move and concentrate in the twin planes that contain the defects in the secondary firing, and it may form conductive layers in these.

After this, the intermediate phosphor is etched with an acid such as HCl to remove the metal oxide adhering to the surface thereof, and this is then washed with KCN to remove copper sulfide adhering to the surface thereof. Next, the intermediate phosphor is dried to obtain EL phosphor powder. This is dispersed in an organic binder, and the resulting dispersion is applied onto a support to form a light-emitting layer thereon.

The light-emitting layer is disposed between a reflective insulating layer of a back electrode and a transparent electrode to construct an electroluminescent device, which is then sealed up with a casing film to complete an electroluminescent lamp. When a voltage is imparted between the two electrodes, the phosphor in the light-emitting layer emits light owing to the high electric field formed between the electrodes. When the phosphor particles are in an electric field, the electric field concentrates in the conductive layers in which the copper ions in the particles are localized, and the intensity of the electric field increases extremely therein. As a result, electrons and holes are generated from the conductive layers and are recombined by the actions of the activator and the co-activator to thereby emit light. In the EL device of the type, it is extremely important to efficiently effect the electron generation. According to the invention, since the electric field is applied to the EL device in such a manner that it may be parallel to the twin planes that include the defects with copper ions localized therein, the electron generation in the device may be effected at high efficiency. If the phosphor particle orientation is at random as in conventional EL devices, only the particles of which the twin planes are parallel to the electric field applied thereto could generate electrons at high efficiency and therefore enable light emission of high brightness, but those of which the twin planes are not parallel to it could not enjoy an increase in the electric field around their defects and therefore their electron generation efficiency is low. When the twin planes are perpendicular to the electric field applied to the particles, then little electron generation may be expected and no light emission could be therefore expected.

For realizing the phosphor layer in which the phosphor particles are oriented relative to the support, it is desirable that phosphor particles are dispersed in a binder dissolved in water or organic solvent and the dispersion is applied onto an insulating reflective layer and dried thereon. In the drying step, when the film thickness change (decrease) is larger, then the particles may be oriented better. For increasing the film thickness change in the drying step in the invention, the ratio by weight of solvent/binder is preferably at least 5, more preferably at least 8, even more preferably at least 10. In conventional techniques of the related art, the amount of the solvent to be used is reduced as much as possible for reducing the drying load. It is sure that the amount of the solvent is as small as possible in view of the production efficiency and the production costs, but the method could not produce bright EL devices as in the present invention.

According to the method of producing the EL device mentioned above, the phosphor particles having an aspect ratio of at least 3 can be oriented in parallel to the electrode that serves as a support for them. In this description, the parallel orientation means that the major axis of the phosphor particle is oriented at an angle not larger than 30° relative to the electrode face. In the invention, it is desirable that at least 80%, more preferably at least 90%, even more preferably at least 95% of all the phosphor particles having an aspect ratio of at least 3 are oriented at an angle not larger than 30° relative to the electrode. The orientation condition of the phosphor particles can be readily recognized through observation with TEM (transmission electronic microscope) or SEM (secondary electronic microscope) of an ultra-thin cross section of the EL device prepared by the use of a microtome.

The invention is described more concretely with reference to the following Example and Comparative Example. Not overstepping the sprit and the scope of the invention, the materials and their amount and proportion, as well as the details and the order of the treatments in the following Example may be suitably varied. Accordingly, the scope of the invention should not be interpreted limitatively by the concrete examples mentioned below.

EXAMPLE 100 g of aggregate powder of zinc sulfide (ZnS) having a particle size of 2 $\mu$m (however, its primary particle size is about 0.01 $\mu$m) was well mixed with 0.1 mol % of copper sulfate ($CuSO_4$) serving as an activator to prepare a slurry, and the resulting mixture was heated and dried in an oven. Next, 50 g of $\alpha$-alumina particles having a mean particle size of 5 $\mu$m was added to the mixture and mixed, and this was then mixed with a flux comprised of 7.0 g of $MgCl_2.6H_2O$, 0.4 g of $BaCl_2.2H_2O$ and 7.0 g of $NH_4Cl$. Next, the mixture was put into a quartz crucible, and fired in air at 1200° C. for 4 hours (first firing). After thus fired, this was washed a few times with deionized water and dried to obtain intermediate powder. To separate the intermediate phosphor particles from the alumina particles that constitute it, the intermediate powder was added to deionized water and ultrasonically stirred. When the stirring was stopped, the alumina particles floated up while the intermediate phosphor particles precipitated in the bottom owing to the difference in the precipitating speed between the two types of the particles, and the upper alumina particles were removed. This operation was repeated a few times to completely remove the alumina particles, and then the intermediate phosphor was taken out and dried.

Next, the thus-dried intermediate phosphor powder was put into a porcelain pot along with alumina beads having a mean size of 1 mm, and milled at 100 rpm for 4 hours. In that manner, physical force was applied to the intermediate particles not grinding them, and crystal defects were thus introduced into the phosphor particles. The phosphor particles having the defects thus introduced thereinto were put into a quartz crucible and again fired therein. The second firing was effected at a temperature lower than the transition temperature from cubic crystals to hexagonal crystals, or that is at 500 to 900° C. for 1 to 4 hours. Triggered by the crystal defects that had been introduced into the particles in the previous treatment, a part or almost all of the intermediate phosphor particles were transferred from hexagonal crystals to cubic crystals in the second firing, and in addition, the copper having been uniformly dispersed inside the particles in the first firing concentrated in the boundaries to form conductive layers that act for electroluminescence. Prior to the second firing, an activator and a co-activator may be supplied to the phosphor particles. After the second firing, the resulting intermediate phosphor was stirred in an aqueous 5% hydrochloric acid solution for 20 minutes to wash it. Further, this was washed with water and then an aqueous KCN solution to remove copper sulfide having remained on the surfaces of the particles. Next, this was washed with deionized water and thereafter heated and dried in an oven to obtain phosphor powder. Of the phosphor particles constituting the thus-obtained phosphor powder, the number of the particles having an aspect ratio of at least 3 was 70% of all the particles. The mean value of the major axis of the particles having an aspect ratio of at least 3 was 30 μm, and the mean value of the minor axis thereof was 6 μm.

COMPARATIVE EXAMPLE

In the same manner as in Example, phosphor powder was prepared for which, however, α-alumina particles having a mean particle size of 5 μm were not added in the first firing. Of the phosphor particles constituting the thus-obtained phosphor powder, the number of the particles having an aspect ratio of at least 3 was only 10% of all the particles. The mean value of the major axis of the particles having an aspect ratio of at least 3 was 20 μm, and the mean value of the minor axis thereof was 13 μm. The phosphor particles formed herein contained many aggregated amorphous particles, and the length of the major axis and the minor axis of many of them was difficult to determine.

TEST EXAMPLE

Light Emission Characteristic Test of Phosphor Powder

Fluororubber was dissolved in an organic solvent (isophorone) in a ratio by weight of 0.1 (rubber)/1 (solvent) to prepare a binder solution. Then, zinc sulfide phosphor was dispersed in the binder solution in a ratio by weight of 0.4 (phosphor)/1 (binder) to prepare a phosphor dispersion. The dispersion was applied onto a sheet of conductive film-coated glass in a method of slide coating to form a layer thereon having a thickness of 200 μm. Next, the coating layer was heated and dried at 170° C. to evaporate away the organic solvent, and a dried phosphor dispersion film was thus formed. Another sheet of conductive film-coated glass was put over the phosphor film to construct an EL device. An alternating current field of 120 V and 1 kHz was applied to the EL device at room temperature, and the relative brightness of the two EL devices was measured. The result is given in Table 1.

TABLE 1

| | Proportion of the particles having an aspect ratio of at least 3 to all the particles | Particles having an aspect ratio of at least 3 | | Relative brightness |
|---|---|---|---|---|
| | | Mean length of major axis | Mean length of minor axis | |
| Example | 70% | 30 μm | 6 μm | 180 |
| Comparative Example | 10% | 20 μm | 13 μm | 100 |

When the EL phosphor powder of the invention that contains at least 30% of phosphor particles having an aspect ratio (length of major axis/length of minor axis) of at least 3 is applied onto a support to be an electrode and dried thereon, then the phosphor particles are oriented in parallel to the support. In this stage, since the (111) face (twin plane) that includes the defects of the phosphor particles is oriented vertically to the support, the electric field applied to the electrodes is parallel to the defects-containing (111) face of the particles. Accordingly, EL devices that comprise the EL phosphor powder of the invention enable bright light emission.

The present disclosure relates to the subject matter contained in Japanese Patent Application No. 297228/2002 filed on Oct. 10, 2002, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. EL phosphor powder which contains phosphor particles that comprise zinc sulfide as a matrix thereof and contain an activator and a co-activator, wherein at least 30% of the number of the phosphor particles contained in the EL phosphor powder are those having an aspect ratio (length of major axis/length of minor axis) of at least 3.

2. The EL phosphor powder of claim 1, wherein at least 40% of the number of the phosphor particles contained in the EL phosphor powder are those having an aspect ratio (length of major axis/length of minor axis) of at least 3.

3. The EL phosphor powder of claim 1, wherein at least 50% of the number of the phosphor particles contained in the EL phosphor powder are those having an aspect ratio (length of major axis/length of minor axis) of at least 3.

4. The EL phosphor powder of claim 1, wherein the EL phosphor particles have a real stacking defects and the mean spacing of the stacking defects is from 0.5 to 20 nm.

5. The EL phosphor powder of claim 1, wherein the activator is at least one ion selected from the group consisting of ions of copper, manganese, silver, gold and rare earth elements.

6. The EL phosphor powder of claim 1, wherein the activator is at least one selected from the group consisting of acetates and sulfates of copper, acetates and sulfates of manganese, acetates and sulfates of silver, acetates and sulfates of gold, and acetates and sulfates of rare earth elements.

7. The EL phosphor powder of claim 1, wherein the co-activator is at least one ion consisting of an element selected from chlorine, bromine, iodine and aluminium.

8. The EL phosphor powder of claim 1, wherein the activator is copper ion and the co-activator is chloride ion.

9. The EL phosphor powder of claim 1, wherein the mean length of the major axis of the EL phosphor particles having an aspect ratio (length of major axis/length of minor axis) of at least 3 is at most 100 $\mu$m.

10. An EL device having the EL phosphor powder of claim 1 between electrodes, wherein at least 80% by number of the phosphor particles having an aspect ratio (length of major axis/length of minor axis) of at least 3 are so oriented that their major axes are at an angle of at most 30° to the faces of the electrodes.

11. An EL device of claim 10, wherein at least 90% by number of the phosphor particles having an aspect ratio (length of major axis/length of minor axis) of at least 3 are so oriented that their major axes are at an angle of at most 30° to the faces of the electrodes.

12. An EL device of claim 10, wherein at least 95% by number of the phosphor particles having an aspect ratio (length of major axis/length of minor axis) of at least 3 are so oriented that their major axes are at an angle of at most 30° to the faces of the electrodes.

13. An EL device of claim 10, which is prepared by dispersing the phosphor particles in a binder dissolved in water or organic solvent, and coating and drying the resultant dispersion.

14. An EL device of claim 13, wherein the ratio by weight of the solvent/the binder is at least 5.

15. An EL device of claim 13, wherein the ratio by weight of the solvent/the binder is at least 8.

16. An EL device of claim 13, wherein the ratio by weight of the solvent/the binder is at least 10.

* * * * *